Oct. 9, 1962 G. F. HAUSMANN Re. 25,253
BOUNDARY LAYER CONTROL APPARATUS FOR COMPRESSORS
Original Filed Nov. 22, 1950
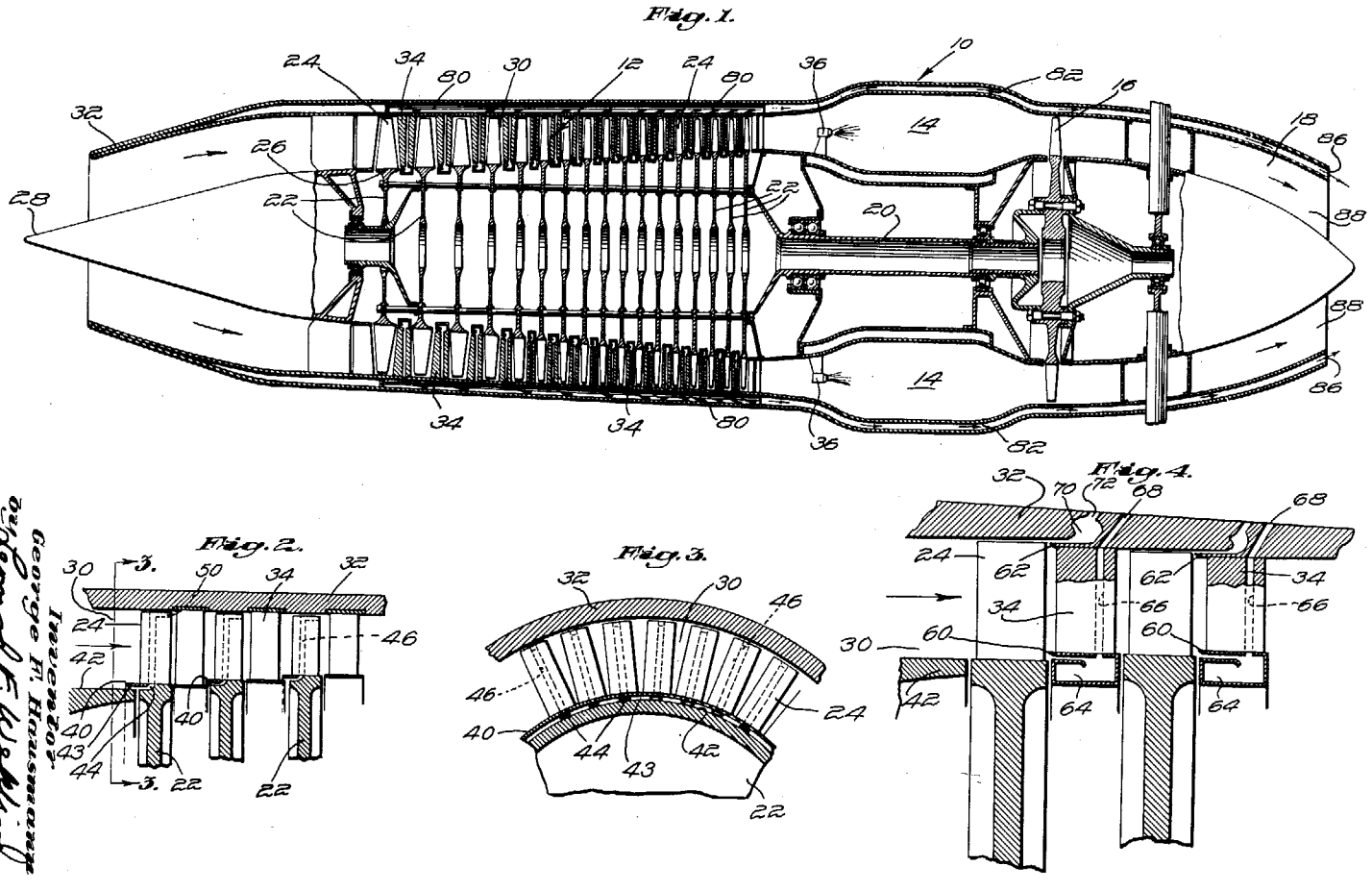
Inventor
George F. Hausmann
by Leonard F. Weklin
Attorney United States Patent Office Re. 25,253
Reissued Oct. 9, 1962

25,253

BOUNDARY LAYER CONTROL APPARATUS FOR COMPRESSORS

George F. Hausmann, Glastonbury, Conn., assignor to United Aircraft Corporation, East Hartford, Conn., a corporation of Delaware Original No. 2,848,155, dated Aug. 19, 1958, Ser. No. 530,349, Aug. 24, 1955, which is a division of Ser. No. 197,144, Nov. 22, 1950, now Patent No. 2,738,921, dated Mar. 20, 1956. Application for reissue Oct. 30, 1958, Ser. No. 770,876

2 Claims. (Cl. 230—122)

Matter enclosed in heavy brackets [ ] appears in the original patent but forms no part of this reissue specification; matter printed in italics indicates the additions made by reissue.

*This is a reissue application of Patent No. 2,848,155, issued August 19, 1958, by George F. Hausmann for Boundary Layer Control Apparatus for compressors, which patent is a* [This application is a] division of application Serial No. 197,144, filed November 22, 1950, now Patent No. 2,738,921, by George F. Hausmann.

This invention relates to boundary layer control for compressors and the like.

It is an object of this invention to provide a boundary layer control mechanism for axial flow compressors whereby the boundary layer flow along the walls of the compressor is continuously removed.

Another object of this invention is to provide a boundary layer control of the type described comprising mechanism for removing the boundary layer flow adjacent the inner and/or outer wall of a compressor passage and exhausting the boundary layer to a low pressure region.

A still further object of this invention is to provide a boundary layer control of the type described wherein the boundary layer is removed from the inner compressor wall and is exhausted through spanwise passages internally of the compressor blades, and from such passages to a low pressure region or to the region adjacent the outer ends of the blades.

These and other objects of this invention will become readily apparent from the following detailed description of the accompanying drawings in which:

FIG. 1 is a cross-sectional view of a gas turbine engine including an axial flow compressor utilizing a preferred embodiment of this inventon.

FIGS. 2 and 3 are cross-sectional views illustrating modification of the FIG. 1 construction.

FIG. 4 is a cross-sectional view illustrating another embodiment of this invention.

Referring to FIG. 1, a gas turbine engine 10 is illustrated having an axial flow compressor section 12, a burner or combustion section 14, a turbine 16 and an exhaust nozzle 18. The turbine 16 drives a shaft 20 which in turn supports and drives a plurality of compressor blade rotors 22. The rotors 22 comprise a plurality of hub elements fixed together to form a hub which thus disposed carries a plurality of peripherally as well as axially spaced impeller blades 24. The outer periphery 26 of the hub forms a downstream continuation of the inlet cone 28 thereby comprising the inner wall for the compressor passage 30. A casing 32 surrounds the compressor thereby forming an outer wall for the passage 30 and may carry a plurality of stator blades 34 which are successively interposed between the impeller blades carried by each of the rotors 22. A plurality of fuel nozzles 36 may be provided for injecting fuel into the burner or combustion section 14.

In order to increase the efficiency of the compressor and the individual compressor blades it is desirable to remove the boundary layer which may build up along the walls of the compressor passage 30. As illustrated in FIG. 2, the rotors 22 carry flanged annular members 40 which form a scoop spaced from the inner wall 42 of the compressor passage 30. The scoop 40 extends upstream and terminates in a lip which is located upstream of the compressor blade 24. The scoop 40 forms an annular chamber 43 with the inner wall 42 of the compressor passage which communicates via apertures 44 in the base of the rotor blades (see also FIG. 3) with drilled passages 46 in each of the impeller blades 24. The passages 46 terminate in an opening 50 adjacent the trailing edge and the outer extremity of the blade 24.

In a compressor passage as illustrated, a suction action is developed within the drilled passage 46 by the pressure gradient between the root and tip of the rotating blades. Since the pressure gradient is proportional to the difference of the square of the tangential velocity at the roots and tips of the blades, a lower pressure will exist at the outer extremity of each of the rotating blades than at the root thereof thereby inducing flow through the chamber 43, the apertures 44, passages 46 and out through the opening 50 adjacent the tip of the blades. Thus the air is actually centrifuged outwardly from within the blade passages 46 so that a pumping action occurs.

Since the area of an axial flow compressor passage is reduced at each successive downstream compressor stage, each successive scoop 40 extends outwardly into the stream a greater amount than the adjacent upstream scoop. This result is produced by enlarging the diameter of each successive hub 22 in a downstream direction or by spacing each successive downstream scoop farther from the axis of rotation of the rotors.

FIG. 4 illustrates another modification of the principles just described which modification comprises the bleeding of boundary layer flow from along both the outer and inner walls 32 and 42, respectively, of the compressor passage 30. In this version of the invention a scoop 60 is provided adjacent the root end of the stator blades 34 and a second scoop 62 is provided adjacent the radially extreme end of the stator blades 34. The scoop 60 inducts boundary layer air into an annular chamber 64 which communicates with drilled passages 66 in stator blades 34, which passages in turn lead to the surrounding atmosphere via the passage or restriction 68 in the outer casing 32. Similarly the scoop 62 inducts boundary layer flow along the outer wall and emits this fluid into a second annular chamber 70 also leading to the atmosphere by means of the opening or restriction 72.

Since the boundary layer is removed from along the compressor walls at a point downstream of the first compressor stage, the surrounding or atmospheric air will be of a lower pressure than that existing adjacent the scoops 60 and 62. As a result, a continuous flow of boundary layer fluid is maintained from along the compressor walls to the outside relatively low pressure air.

Rather than exhausting boundary layer air via the openings 68 and 72 to the atmosphere, it may be desirable as illustrated in FIG. 1 to conduct this fluid via passages 80 to annular chambers 82 which surround the burner or combustion section 14. Thus, any desired portions adjacent the burner area or other critical areas can be cooled by the boundary layer flow which is removed from the compressor walls. This boundary layer flow will then pass outwardly to the atmosphere if so desired. In order to improve the flow of boundary layer air it may be desirable to discharge the air via an opening 86 adjacent the exhaust nozzle 88. In this manner the ejector action of the turbine exhaust will improve the exit flow of boundary layer fluid and provide a pumping force.

As a result of this invention it is apparent that a simple yet efficient boundary layer control apparatus has been provided whereby no external power is necessary to conduct boundary layer flow away from the walls of an axial flow compressor.

Although only certain embodiments of this invention have been illustrated and described herein, it will be apparent that various changes and modifications may be made in the construction and the arrangement of the various parts without departing from the scope of this novel concept.

What it is desired to obtain by Letters Patent is:

*1.* In an axial flow compressor having a plurality of impeller blades, a hub, said blades extending radially from said hub and forming a plurality of rows, a casing surrounding said impeller blades and forming with said hub an annular passage having inner and outer walls converging in a downstream direction, stator blades carried by said casing and extending across said annular passage in alternate rows cooperating with said impeller blades, scoops carried by the ends of at least one row of stator blades adjacent said hub and adapted to intercept the boundary layer flow along the inner wall of said annular passage, said scoops intercepting the boundary layer at a point immediately upstream of the leading edge of said stator blades, passage means in said stator blades connecting said scoops with the outer radial ends of said stator blades, a source of pressure lower than the pressure in said compressor, and scoop means carried by the outer radial ends of said one row of stator blades and intercepting the boundary layer flow along said outer walls immediately upstream of the leading edge of said stator blades, said scoop means having a fluid connection with said source.

*2. In an axial-flow compressor, a rotary element having a hub portion, a plurality of circumferentially spaced radial blades mounted on said hub portion, a plurality of radial stationary guide vanes mounted downstream of said blades for receiving air driven therepast, each of said guide vanes having a vent passage with an inner opening disposed closely adjacent said hub portion for extracting local accumulations of boundary layer air, an annular shroud mounted on the inner ends of the guide vanes, and an inwardly extending annular flange formed on said shroud, said shroud having circumferentially spaced apertures communicating with the respective passages in the guide vanes.*

References Cited in the file of this patent or the original patent

| | | |
|---|---|---|
| 2,332,322 | Kraft | Oct. 19, 1943 |
| 2,720,356 | Erwin | Oct. 11, 1955 |

FOREIGN PATENTS

| | | |
|---|---|---|
| 619,722 | Great Britain | Mar. 14, 1949 |